UNITED STATES PATENT OFFICE

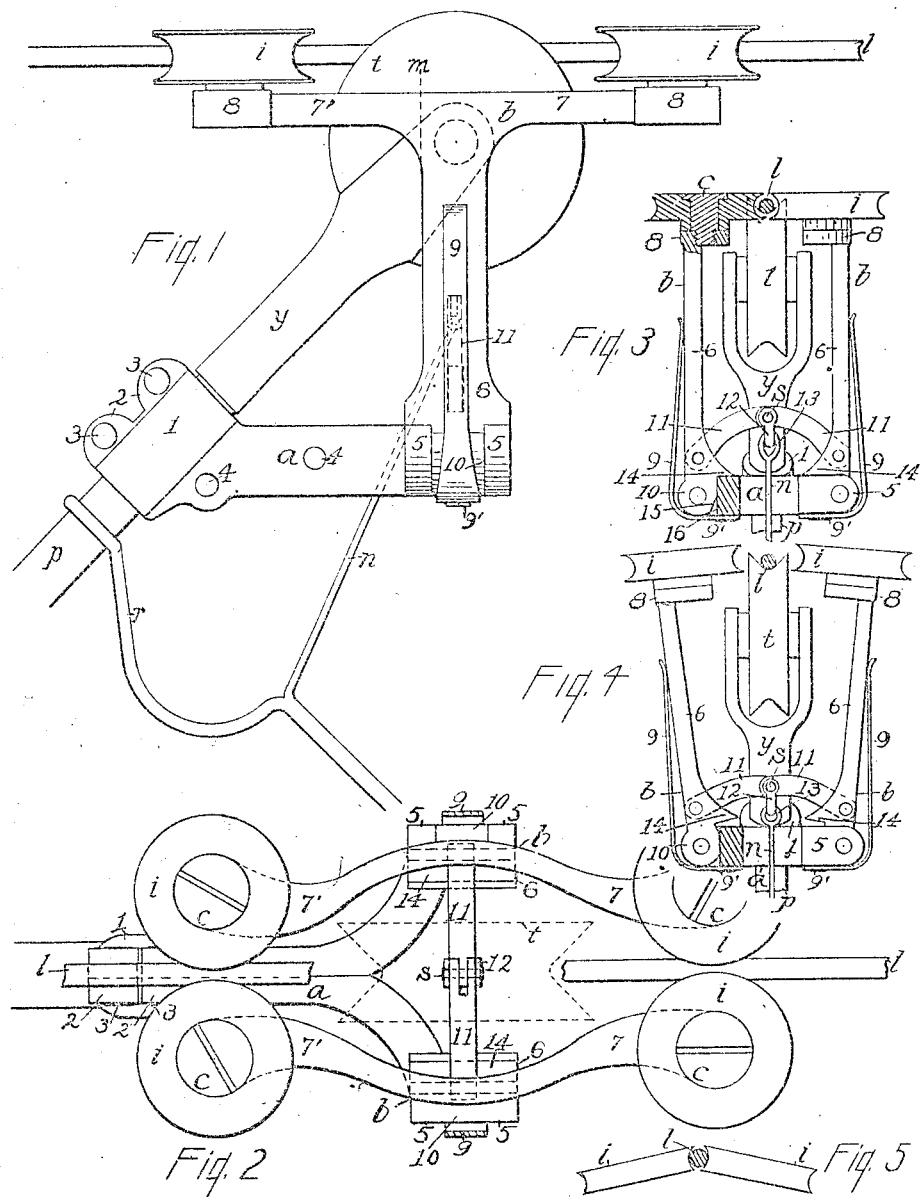

FRANK V. POLAKOSKEY, OF PEEKSKILL, NEW YORK, ASSIGNOR OF ONE-THIRD TO P. W. O'BRIEN AND ONE-THIRD TO THOMAS McPHILLIPS, OF PEEKSKILL, NEW YORK.

TROLLEY ATTACHMENT.

No. 926,020.   Specification of Letters Patent.   Patented June 22, 1909.

Application filed June 23, 1908. Serial No. 439,889.

*To all whom it may concern:*

Be it known that I, FRANK V. POLAKOSKEY, a citizen of the United States, and resident of Peekskill, in the county of Westchester and State of New York, have invented certain new and useful Trolley Attachments, of which the following is a specification.

This invention relates to trolley wheels, and has for its objects means for keeping the trolley on the line, and also as an additional means of conducting current from the line.

The objects are attained by the means set forth in these specifications and the accompanying drawings, which I declare to be a full, clear and exact description of my invention.

Referring to the drawings, Figure 1 is an elevation of my combination with the trolley wheel. Fig. 2 is a plan of the same. Fig. 3 is an end elevation, reduced in size, showing the device closed upon the line wire. Fig. 4 is an end elevation showing the device separated from the line wire. Fig. 5 shows the side wheels set at angles with the trolley wheel and as making contact with the line wire.

In Fig. 1 $p$ represents a trolley pole, $y$ the trolley yoke, and $t$ the trolley wheel. A bracket $a$ is, preferably, made in two parts, as shown in Fig. 2, so that it may be clamped on the pole by means of the curved portions 1, having lugs 2 2 through which bolts or rivets 3 are secured. Fastenings 4 4 are also provided through the arm parts of the bracket. The ends of the bracket arms have hinge lugs 5 5, shown in the first four figures, to which the vertical arms $b$ are hinged, the hinge lug 10 being a part of the arm $b$. The upper ends of the arms $b$ have extensions 7' 7 each side of the trolley wheel, parallel with the line wire horizontally, but are curved around the trolley wheel as shown in Fig. 2, the wheel being shown in broken lines.

The ends of the branches 7' 7 of the arms $b$ are provided with hubs 8, to which grooved wheels $i$ are pivoted, as shown in cross-section in Fig. 3, the pivot consisting of a stud $c$ with a head flush with the top of the wheel. Thus, there are two grooved wheels on each side of the line wire, and their grooves embrace the wire as shown in Figs. 2 3 5.

The arms $b$ are held in their normal positions by springs 9 9 fastened to the bracket at 9' 9', Figs. 1 3 4. When used solely for the purpose of preventing the trolley wheel leaving the line wire, the wheel $i$ need not be in constant contact with the wire, thus saving them from wear and not interfering with their object. Their normal positions would then be as in Fig. 3, $l$ representing the wire, and the wheels shown as not having contact with it. The wheels are thus held at a fixed point by means of projections 14 14, Figs. 3 4, on the hinged parts of the arms $b$, these projections having lodgment against the arms of the bracket $a$. To limit the outward movement of the wheels, a stop is shown in Figs. 3 4 consisting of a flattened part 15 on the hinge lug 10 that engages with the flat surface 16 of the bracket. Fig. 4 shows the action of these several parts.

To open the wheels $i$ from the line wire, levers 11 11 are pivoted in the arms $b$, as shown in Figs. 1 to 4 inclusive, and are hinged together midway between the arms. Upon the hinge pintle $s$ is a hook 12 to which a line $n$ is shown connected at 13, for operating the wheels.

Fig. 1 shows the connection of the line $n$ with the rope that is used for manipulating the trolley pole. When the rope $r$ is pulled pressure first comes upon the line $n$. The springs $n$ are adapted in strength to require less to move them than will be required to move the pole, so that the opening of the pulleys $i$ will be the first result of pulling the trolley pole. This arrangement of grooved wheels contiguous to the trolley wheel and at right angles thereto will effectually prevent the trolley from leaving the wire unassisted. These wheels may also be used as current carriers in addition to the trolley wheel by permitting them to run in contact with the line wire, as shown in Fig. 5, and connecting the bracket $a$ with the yoke $y$, which may be done by attaching the bracket to the yoke instead of to the pole if the yoke is insulated from the pole. Fig. 5 also indicates how the pulleys $i$ may be set at an angle to the trolley wheel, which in some cases would be an advantage in passing line hangers. It may be desirable in some instances to dispense with one pair of pulleys, which can be done by omitting the arms 7', as on the broken line $m$, Fig. 1, thus making the pulley arm consist of the vertical part 6 and the arm 7.

In the production of this device I do not wish to be restricted to the precise construction herein shown so long as I adhere to the principles of the invention.

Having described my invention what I claim and desire to secure by Letters Patent is—

In combination with a trolley pole and trolley wheel, a bracket attached to the pole, vertical arms with top extensions hinged to said bracket on each side of the trolley wheel, grooved pulleys on the ends of the extended arms the grooves of opposite pulleys adapted to embrace the line wire, springs secured to the bracket and acting against the pulley arms, stops on the said arms to limit their movements, levers pivoted in the pulley arms and hinged midway between them and a short line connected therewith and with the trolley pole line.

Signed at Peekskill, in the county of Westchester and State of New York this 20th day of June A. D. 1908.

FRANK V. POLAKOSKEY.

Witnesses:
JAS. J. VAUGHEY,
HARRY B. TICE.